United States Patent
Fiegener et al.

(10) Patent No.: US 10,539,248 B2
(45) Date of Patent: Jan. 21, 2020

(54) ROTATABLE VALVE ASSEMBLY WITH PLUG SEAL

(71) Applicant: BS&B INNOVATION LIMITED, Limerick (IE)

(72) Inventors: Sarah Fiegener, Tulsa, OK (US); Charles Beair, Tulsa, OK (US); John Tomasko, Limerick (IE); Sirish Bhaskar, Chennai (IN); Dan Goehler, Tulsa, OK (US)

(73) Assignee: BS&B Innovations Limited, Limerick (IE)

( * ) Notice: Subject to any disclaimer, the term of this patent is extended or adjusted under 35 U.S.C. 154(b) by 0 days.

(21) Appl. No.: 14/916,278

(22) PCT Filed: Sep. 3, 2014

(86) PCT No.: PCT/US2014/053908
§ 371 (c)(1),
(2) Date: Mar. 3, 2016

(87) PCT Pub. No.: WO2015/034929
PCT Pub. Date: Mar. 12, 2015

(65) Prior Publication Data
US 2016/0195192 A1    Jul. 7, 2016

Related U.S. Application Data

(60) Provisional application No. 61/959,845, filed on Sep. 4, 2013.

(51) Int. Cl.
*F16K 15/14* (2006.01)
*F16K 17/02* (2006.01)
*F16K 25/00* (2006.01)

(52) U.S. Cl.
CPC ............. *F16K 17/02* (2013.01); *F16K 25/00* (2013.01)

(58) Field of Classification Search
CPC .. F16K 15/038; F16K 27/0227; F16K 25/005; F16K 15/03
(Continued)

(56) References Cited

U.S. PATENT DOCUMENTS 2,304,491 A    12/1942    Allen
3,039,482 A     6/1962    Goldberg
(Continued)

FOREIGN PATENT DOCUMENTS

DE    20 2009 008 845 U1    9/2009

OTHER PUBLICATIONS

Office Action, Chinese Application No. 201480052932.9 (dated Jun. 20, 2017) (6 pages), with English-language translation (8 pages) (14 pages total).
(Continued)

*Primary Examiner* — P. Macade Nichols
(74) *Attorney, Agent, or Firm* — Finnegan, Henderson, Farabow, Garrett & Dunner, LLP

(57) ABSTRACT

A rotatable valve assembly (20) is disclosed. In one embodiment, the rotatable valve assembly (20) includes a valve body (22) and a valve plug (24). The valve plug (24) includes a seal configured to form a fluid-tight barrier with an interior surface of the valve body. The rotatable valve assembly may include additional seals, including a seal (96) provided in the valve body (22). The rotatable valve assembly (20) further may be used with a release mechanism (40) to control the pressure at which the valve plug (24) rotates into an open position.

10 Claims, 8 Drawing Sheets

(58) Field of Classification Search
USPC .............. 137/512, 512.1, 527; 251/173, 305
See application file for complete search history.

(56) References Cited

U.S. PATENT DOCUMENTS

| | | | |
|---|---|---|---|
| 3,343,805 A * | 9/1967 | Felton | F16K 27/0218 |
| | | | 251/306 |
| 3,472,284 A | 10/1969 | Hosek | |
| 3,603,333 A | 9/1971 | Anderson | |
| 4,090,529 A * | 5/1978 | Schuller | F16K 15/03 |
| | | | 137/516.29 |
| 4,205,820 A | 6/1980 | Bray | |
| 4,243,203 A * | 1/1981 | Mack | F16K 1/222 |
| | | | 251/305 |
| 4,367,861 A | 1/1983 | Bray et al. | |
| 4,724,857 A | 2/1988 | Taylor | |
| 4,787,409 A | 11/1988 | Taylor | |
| 4,930,536 A | 6/1990 | Taylor | |
| 4,944,489 A * | 7/1990 | Adams | F16K 1/2266 |
| | | | 251/174 |
| 4,977,918 A | 12/1990 | Taylor | |
| 5,012,834 A | 5/1991 | Taylor | |
| 5,067,511 A | 11/1991 | Taylor | |
| 5,116,089 A | 5/1992 | Taylor | |
| 5,146,942 A | 9/1992 | Taylor | |
| 5,209,253 A | 5/1993 | Taylor | |
| 5,226,442 A | 7/1993 | Taylor | |
| 5,273,065 A | 12/1993 | Taylor | |
| 5,297,575 A | 3/1994 | Taylor | |
| 5,311,898 A | 5/1994 | Taylor | |
| 5,318,060 A | 6/1994 | Taylor | |
| 5,348,039 A | 9/1994 | Taylor et al. | |
| 5,373,864 A | 12/1994 | Taylor | |
| 5,433,239 A | 7/1995 | Taylor | |
| 5,607,140 A | 3/1997 | Short, III et al. | |
| 5,871,203 A * | 2/1999 | Gasaway | F16K 1/2263 |
| | | | 251/305 |
| 5,947,445 A | 9/1999 | Wang et al. | |
| 6,098,495 A | 8/2000 | Wang et al. | |
| 6,367,498 B1 | 4/2002 | Brazier et al. | |
| 6,488,044 B2 | 12/2002 | Brazier et al. | |
| 6,491,055 B2 | 12/2002 | Brazier et al. | |
| 7,264,221 B2 * | 9/2007 | Yeary | F16K 1/22 |
| | | | 251/305 |
| 9,273,789 B2 * | 3/2016 | Schmidt | F16K 17/02 |
| 2008/0315143 A1 | 12/2008 | Mendoza et al. | |

OTHER PUBLICATIONS

International Search Report from the European Patent Office for International Application No. PCT/US2014/053908 dated Jan. 7, 2015.

* cited by examiner

ROTATABLE VALVE ASSEMBLY WITH PLUG SEAL

PRIORITY CLAIM

This application claims priority to U.S. Provisional Application No. 61/959,845, filed Sep. 4, 2013, the entire contents of which are hereby incorporated by reference.

FIELD

The present disclosure relates to a system for relieving pressure from a pressurized system. More particularly, the disclosure relates to a rotatable valve assembly that may be used as a pressure relief device.

BACKGROUND

There are many types of systems that process or use a pressurized fluid, To ensure the safety of these types of systems, each such system typically includes a safety device designed to prevent the over-pressurization of the system. In an emergency situation, where the fluid in the system reaches an unsafe level, the high pressure of the fluid acts on the safety device to create an opening to release fluid from the system. Venting fluid to the environment or a safety reservoir through the opening reduces the pressure in the system and prevents another portion of the system from failing due to the high pressure of the fluid. Examples of known safety devices are disclosed, for example, in U.S. Pat. Nos. 3,472,284, 3,039,482, 2,304,491, 3,603,333, 4,724,857, 4,787,409, 4,930,536, 4,977,918, 5,012,834, 5,067,511, 5,116,089, 5,146,942, 5,209,253, 5,226,442, 5,273,065, 5,297,575, 5,311,898, 5,318,060, 5,348,039, 5,373,864, and 5,433,239.

One type of safety device for a pressurized system is a pressure relief valve, which may be a reclosing valve or a non-reclosing valve. Typically, a spring, a pin, or a combination of a spring and pin, is used to hold a moving plug in sealing engagement with the body or housing of the device while connected to the pressurized system. When the pressure of the fluid reaches the predetermined safety level in such systems, the force exerted on the plug by the pressurized fluid overcomes the bias of the spring or exceeds the resistance of the pin that holds the plug in place. When either of these events occurs, the pressurized fluid moves the plug to expose an opening through which fluid may escape to relieve the pressure in the system. Reclosing valves will automatically reset once the pressurized fluid at the inlet of the device has reduced sufficiently for the spring or other mechanism to reseat the plug. Non-reclosing valves require that the device be manually reset so that the valve plug is re-engaged with the seal and, if necessary, the pin or other expendable component replaced.

One type of pressure relief valve is a rotatable valve assembly. Known rotatable valve assemblies are disclosed in commonly owned U.S. Pat. Nos. 5,607,140, 5,947,445, 6,098,495, 6,367,498, 6,488,044, and 6,491,055, the entire contents of each of which are expressly incorporated herein by reference. A rotatable valve includes a plug that is mounted on a rotatable shaft and may be rotated between a closed position where the plug blocks the flow of fluid and an open position where the plug allows fluid to flow through the valve. The rotation of the plug to the open position may be initiated manually or by another external force. Alternatively, the plug may be mounted on the shaft so that the rotational axis of the plug is offset relative to the center of the plug, so that the pressurized fluid exerts a torque on the shaft and urges the plug to rotate. A device may be coupled to the shaft to prevent the shaft from rotating until the torque on the shaft reaches a certain level, indicating that the pressure of the fluid has reached an over-pressure situation. At that point, the shaft is released and the plug rotates to open the valve and vent the system.

A valve disposed in a pressurized system will often include a seal between the body and the plug to limit or prevent fluid from leaking through the valve. As illustrated, for example, in U.S. Pat. No. 6,367,498, a known seal is disposed in a valve body and is configured to engage with the outer perimeter of the valve plug to prevent pressurized fluid from flowing between the plug and the body while the valve is closed. Because a known seal is disposed in a valve body, it is held stationary while the valve plug rotates. As such, there is limited control over the sealing mechanism, including the interface between moving and non-moving parts of the valve assembly. In addition, the valve body is subject to deformation in the event of irregular loading within the piping or another portion of a pressurized system. Such irregular loading can deform a seal provided within the valve body, thereby negatively affecting the seal's performance. To replace a known seal provided in the valve body, the valve must be disassembled, which may be costly and time-consuming. Additionally, a known valve positions the seal perpendicular to the flow when the valve is open, which may increase the risk that the seal could be damaged and/or torn out as fluid passes through the valve.

There is a need for a pressure relief device that overcomes one or more of the deficiencies above and/or other deficiencies in the art, and/or provides additional benefits.

SUMMARY

According to one embodiment, a rotatable pressure relief valve assembly comprises a body defining an inner surface and a plug mounted within the body. The plug is rotatable between an open position and a closed position. A seal is provided with the plug and is configured to form a fluid-tight barrier with the body when the plug is in the closed position.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

Figure 1:
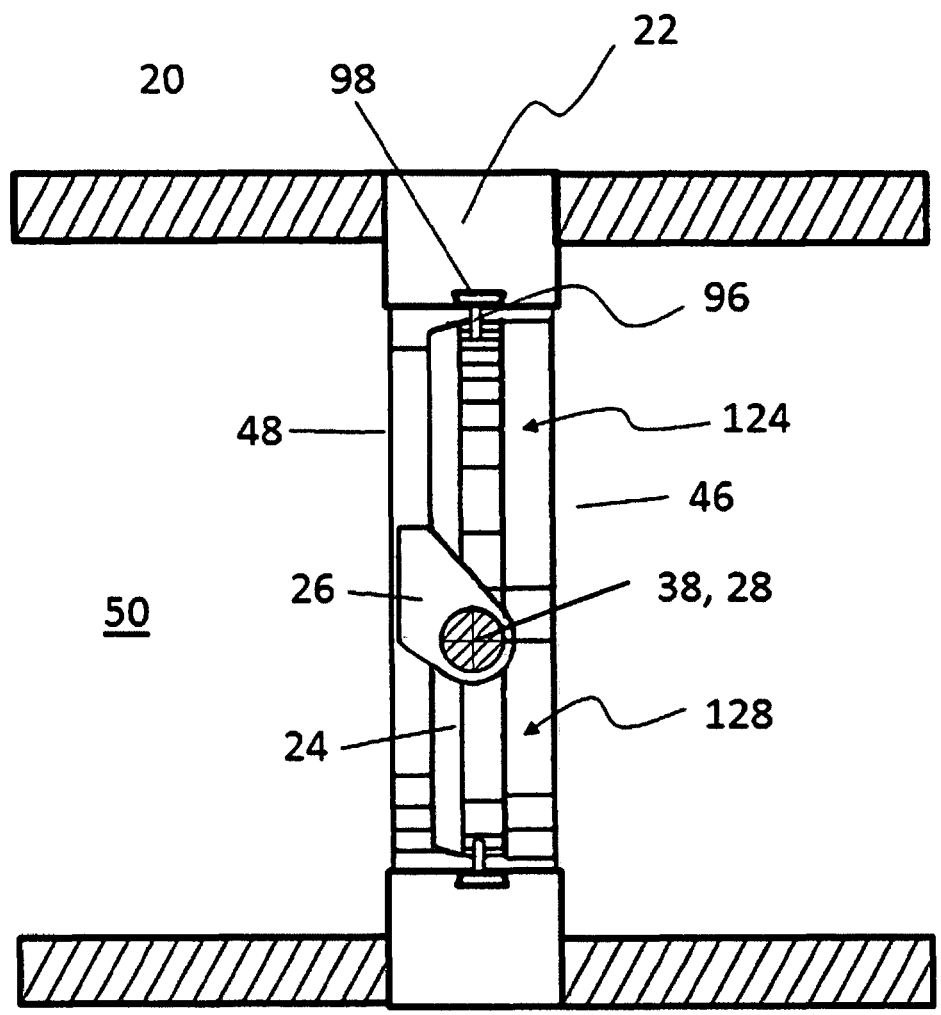
FIG. 1 illustrates a cross-sectional view of a rotatable valve assembly.

Reference will now be made in detail to the present exemplary embodiments, examples of which are illustrated in the accompanying drawings. Wherever possible, the same reference numbers will be used throughout the drawings to refer to the same or like parts. The drawing figures of this application are intended to provide a general understanding of the working elements of the underlying system. Accordingly, unless explicitly stated, the figures do not represent a literal depiction of proportional dimensions or the precise locations for the illustrated inter-related components.

FIG. 1 illustrates one embodiment of a rotatable valve assembly 20 of the present disclosure, The assembly 20 includes a valve body 22, a valve plug 24, and a mount 26 for rotatably mounting the valve plug 24 in the valve body 22 about a shaft 38 defining a rotational axis 28. The body 22 has an inlet 46 and an outlet 48 defining a fluid passageway 50 through the body 22. The inlet 46 of the body 22 receives fluid and pressure from a fluid pressure source (not illustrated), such as a vessel or piping.

The shaft 38 may extend through the body 22 and may be rotatable with the plug 24, relative to the body 22, about the rotational axis 28. The shaft 38 may be a single, continuous shaft extending across a face of or through the plug 24, or may be one or more shaft ends, axles, ears, or the like which extend from the plug 24 through the body 22. Limit switches, motion detection switches, or the like (not shown) may be provided at either or both outside ends of the shaft 38 to indicate whether the plug 24 is in the open or closed position and/or has been opened or closed.

The valve assembly 20 may further include a seal 96 for sealing the gap between the circumferential perimeter of the valve plug 24 and the fluid passageway 50 of the valve body 22, when the valve plug 24 is in the closed position. Unlike a known rotatable valve (in which a seal is provided within the valve body), the seal 96 of the illustrated embodiment is provided within the valve plug 24.

Providing the seal 96 within the plug 24 provides advantages over a known valve (which includes the seal within the valve body). Specifically, providing a seal 96 within the plug 24 provides more precise control of the sealing mechanism, including the interface between the moving (e.g., plug 24) and non-moving (e.g., body 22) parts of the valve assembly. In addition, a seal provided within a plug 24 is kept apart from the forces communicated to the valve body 22 when the valve body 22 is installed within piping or another portion of a pressurized system. It has been observed that irregular loading of piping—particularly on larger nominal size piping systems—can lead to problems, including the development of deformation within the valve body. Such deformation may impair the performance of a body-mounted seal. According to the present disclosure, however, the seal 96 is independent from the deformation of the valve body 22.

Providing a seal 96 within a plug 24 may also provide an advantage when replacing the seal 96. Rather than disassemble the entire valve and/or remove the valve body from the piping or other pressurized system (as is required to replace known in-body seals), the seal may be replaced with the valve intact and/or installed. Additionally, or alternatively, the valve plug 24 may be removed for seal 96 replacement, while the body 22 is left intact.

Providing a seal 96 within a plug 24 may also provide an advantage when the valve is opened. When the disclosed plug 24 and seal 96 open, such that fluid may escape the valve, the seal 96 may be positioned other than perpendicularly to the fluid flow path. In one embodiment, the seal 96 may be positioned substantially parallel to the fluid flow path when the valve is opened. When a known seal is positioned perpendicular to a fluid flow path, the fluid may be more likely to damage or tear out the seal. Thus, by positioning the seal 96 on the plug 24 as disclosed, the seal 96 may be protected from such damage.

As illustrated in FIG. 1, the valve body 22 is provided with a mating surface 98 configured to mate with the seal 96. The properties of mating surface 98 (e.g., material or shape) may be selected to optimize the interface with the seal 96. For example, the attributes of mating surface 98 may be selected to reduce or increase friction between mating surface 98 and the seal 96. The mating surface 98 may be made of the same material as the valve body 22, or the mating surface 98 may be made of a different material. The mating surface 98 may be formed integrally within the valve body 22, or the mating surface 98 may be an added component or added layer inserted into and/or mounted on valve body 22. The mating surface 98 also may be shaped to achieve a desired interface with the seal 96.

Figure 6:
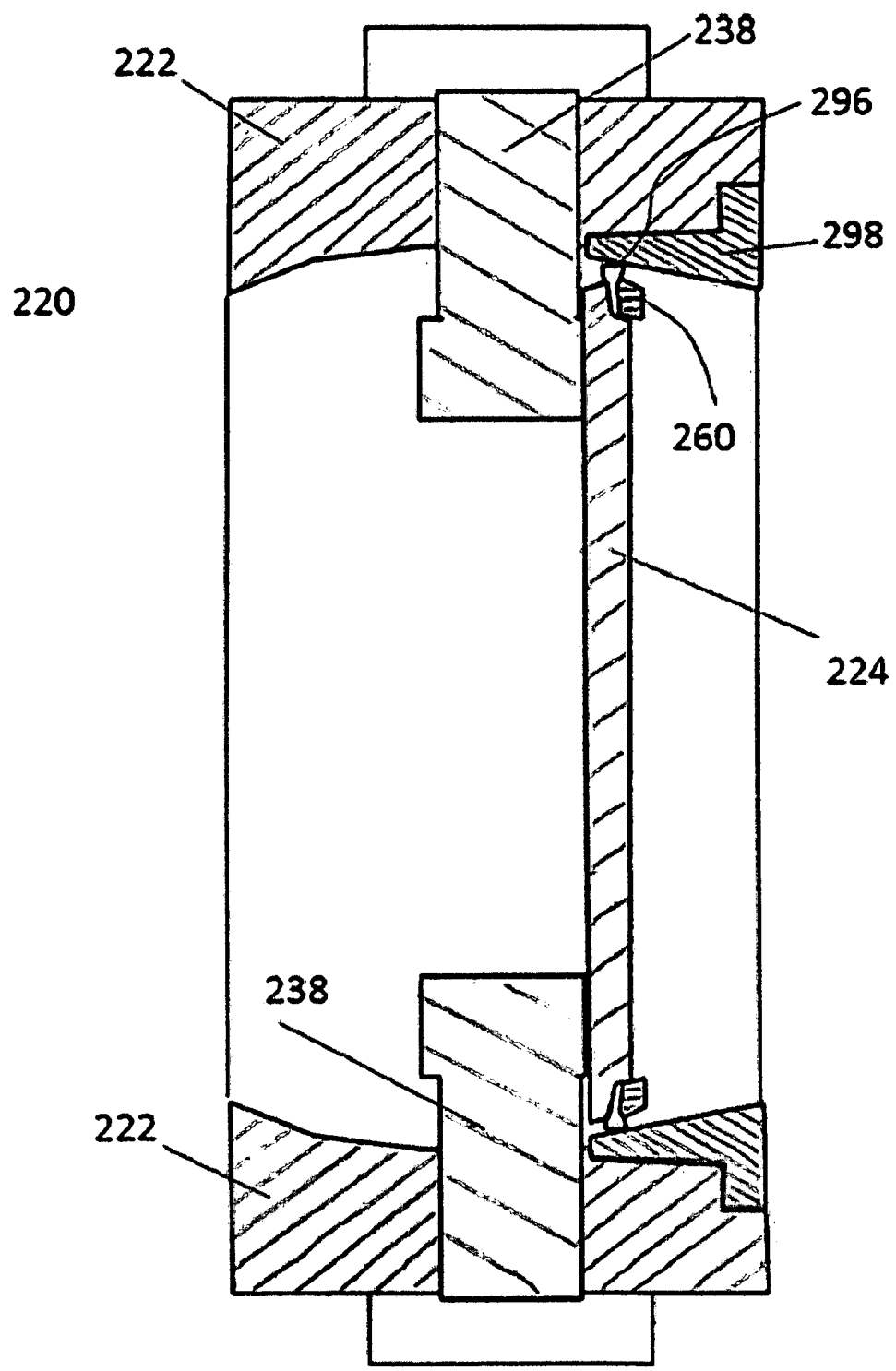
FIG. 6 illustrates another embodiment of a rotatable valve assembly.

As illustrated in FIG. 1, the valve plug 24 may be mounted for eccentric rotation in the passageway 50. The rotational axis 28 of the shaft 38 and plug 24 is offset in at least one direction from the diameter of the plug 24. As a result, the first portion 124 of the plug 24 on the first side of the rotational axis 28 is larger and has greater area exposed to the inlet fluid pressure than the second portion 128 of the plug 24 on the second side of the rotational axis 28. This creates a moment and torque about the rotational axis 28 and shaft 38. This arrangement has another advantage in that the shaft 38 partially balances the fluid pressure on either side of the rotational axis 28 and shaft 38 and therefore reduces the force which the plug 24 must directly resist to seal. As shown in FIG. 1, the rotational axis 28 of the shaft is offset from the central axis of the passageway 50. It also is contemplated that the rotational axis 28 of the shaft may additionally or alternatively be offset upstream or downstream from the plug seal (for example as illustrated in FIG. 6, discussed below).

Figure 2:
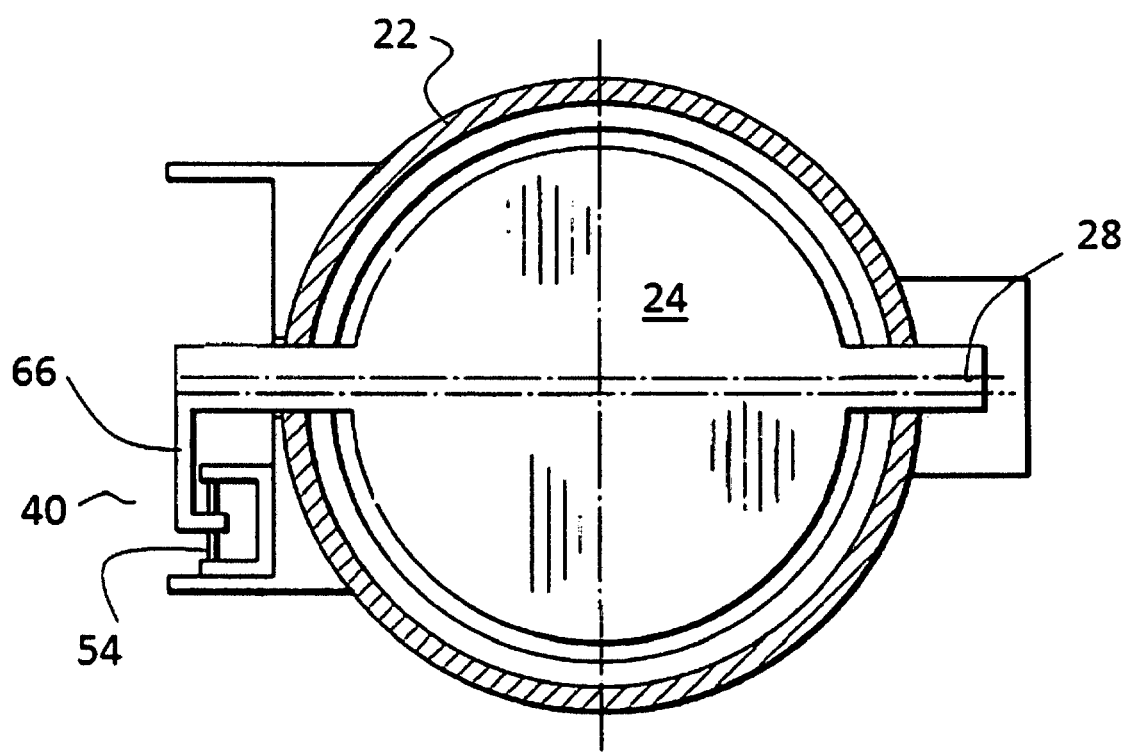
FIG. 2 illustrates a view of the inlet side of the rotatable valve assembly illustrated in FIG. 1.

When valve plug 24 is in a closed position, a pressure in the pressurized system generates a torque on the valve plug 24 about rotational axis 28. As illustrated in FIG. 2, the assembly may include a release mechanism 40 configured to prevent the valve plug 24 from rotating from the closed position when the torque about rotational axis 28 is below a selected magnitude and for releasing the plug 24 and shaft 38 to rotate to an open position when the torque exerted around the rotational axis 28 exceeds a selected magnitude. Additionally or alternatively, the valve plug and/or release mechanism may be preloaded (e.g., with a spring), such as is disclosed, e.g., in co-owned U.S. Pat. No. 6,491,055, the entire contents of which are expressly incorporated above. Preloading may assist to engage the plug seal into a sealed position.

In one embodiment, the release mechanism 40 includes a failure pin 54. As illustrated, the failure pin 54 is mounted on the valve body 22. The release mechanism 40 also includes a contact arm 66, which translates the torque around the rotational axis 28 into a load applied to the failure pin 54. The failure pin 54 is configured to deform and/or fail under a predetermined load applied by the contact arm 66. The failure pin 54 may be a permanently or irreversibly deformable structure, which bends or breaks when subjected to a predetermined load. Although a failure pin 54 is illustrated, the disclosure contemplates the use of any suitable mechanism configured to deform and/or fail under a predetermined load, including but not limited to, a beam, bar, plate, disk, spring, or comparable structure (or any combination thereof). Such mechanisms may be permanently or irreversibly deformable. Alternatively, such mechanisms may be reversibly deformable, such that they return to an initial condition once a deforming load is removed. As noted above, a release mechanism may be preloaded. For example, a failure pin 54 or other deformable failure mechanism may be subject to preloading to reduce the fluid pressure necessary to generate the output force necessary to deform the failure mechanism and open the valve. Co-owned U.S. Pat. No. 6,491,055, expressly incorporated above in its entirety, discloses an exemplary preloading mechanism.

Figure 4:
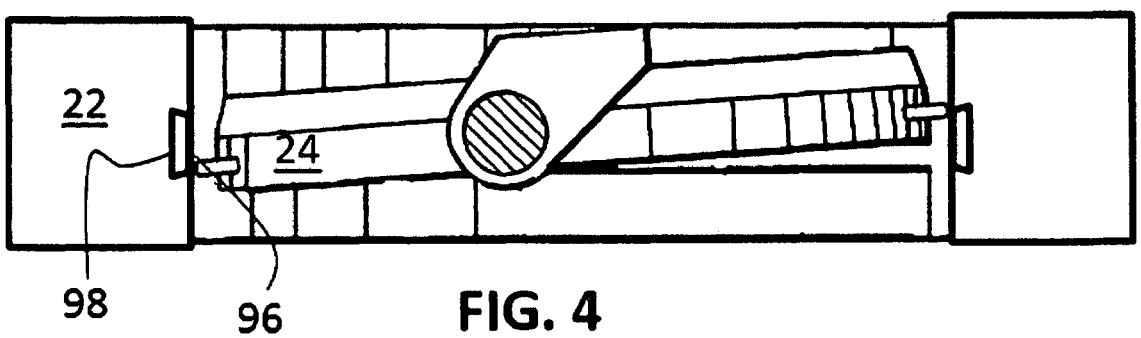
Figure 5:
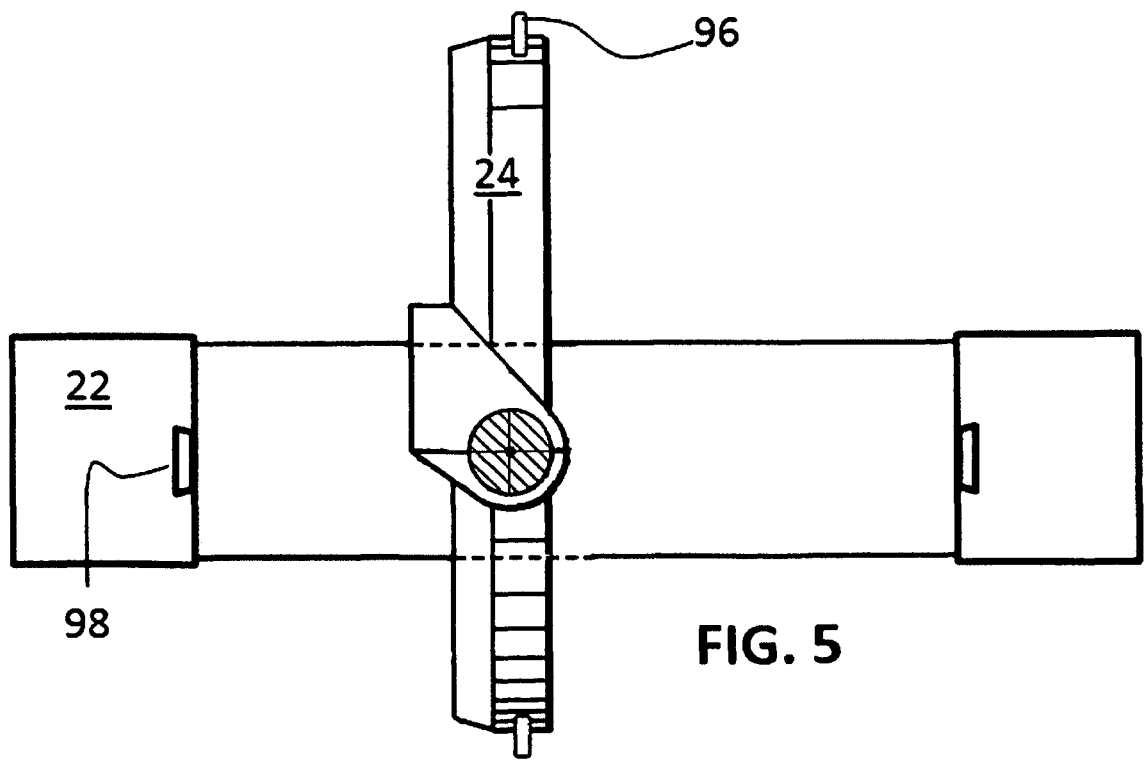
Figure 7:
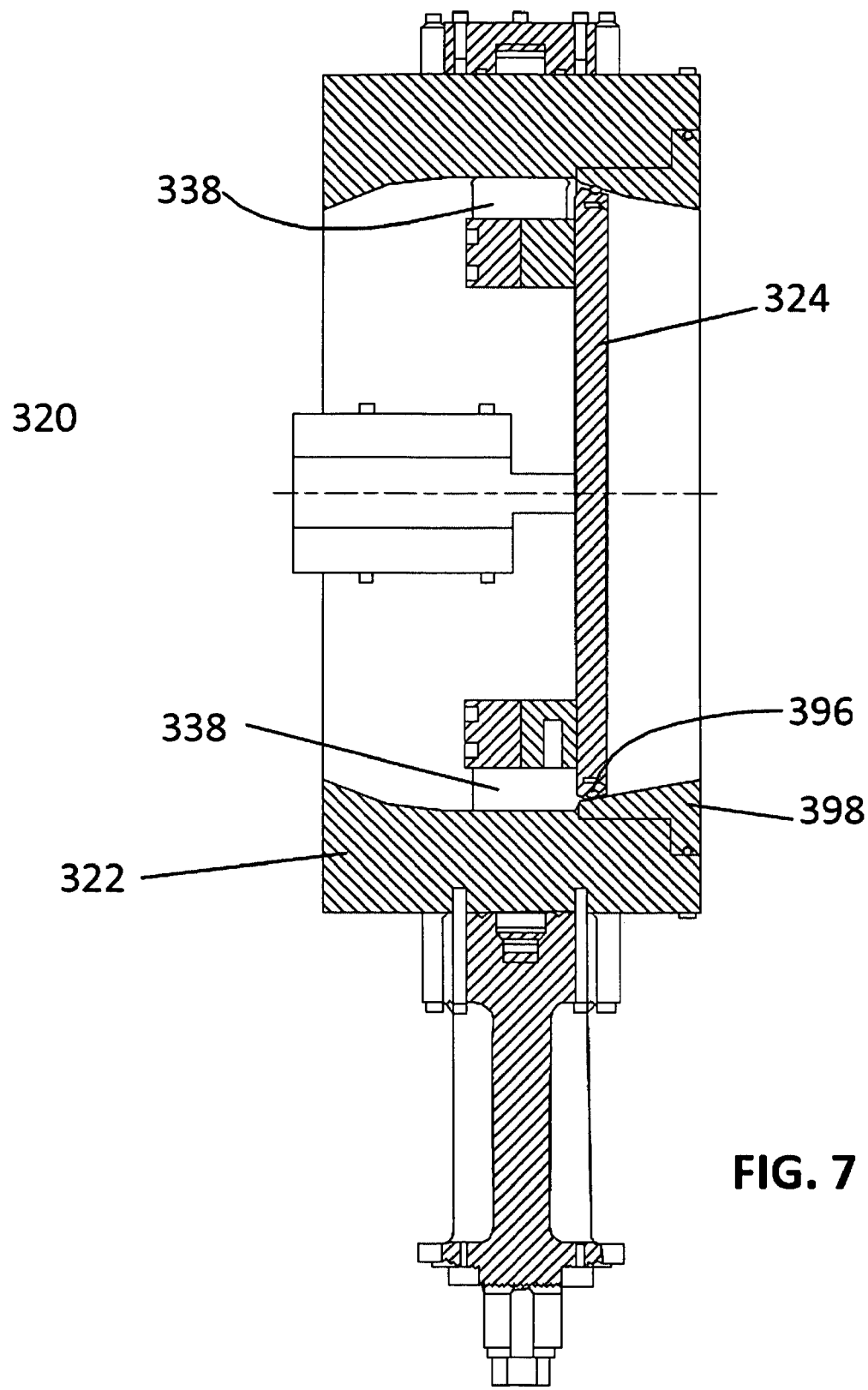
FIG. 7 illustrates yet another embodiment of a rotatable valve assembly.

As illustrated in FIG. 2, the failure pin 54 is subjected to a bending-type load applied by the contact arm 66. It is also contemplated that the failure pin 54 (or other suitable failure mechanism) may be subject to a different type of loading, such as compression, tension, or shear, as illustrated in FIGS. 4-6 of U.S. Pat. No. 5,947,445 (the entire contents of which is incorporated herein by reference). It is further contemplated that a release mechanism may include a magnetic catch configured to prevent the valve plug from rotating until a predetermined load overcomes a magnetic attractive force, as illustrated in FIG. 7 of U.S. Pat. No. 5,947,445 (the entire contents of which is incorporated herein by reference). In another embodiment, the disclosed valve assembly may be used with a linkage assembly such as disclosed in U.S. Pat. Nos. 6,367,498, 6,448,044, and 6,491,055 (the entire contents of which are incorporated herein by reference) to control the opening of the valve plug.

Figure 3:
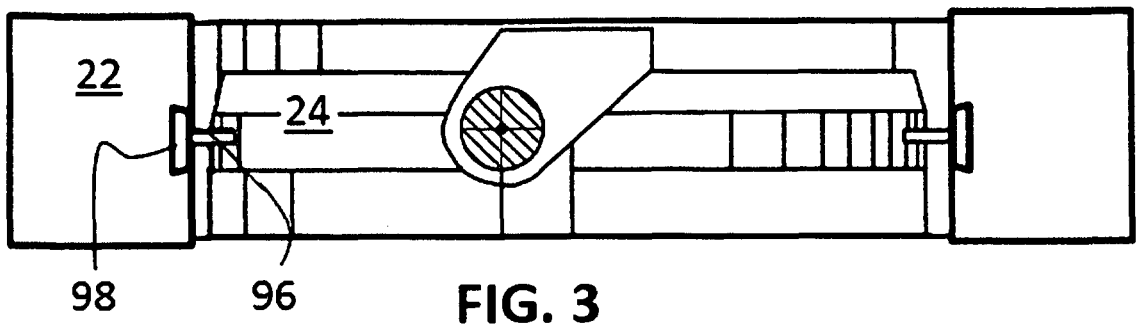
FIGS. 3-5 illustrate the rotatable valve assembly of FIG. 1 in operation.

FIGS. 3-5 illustrate the valve assembly of FIG. 1 in operation, As illustrated in FIG. 3, the valve plug 24 is in a closed position, and the seal 96 forms a fluid-tight seal against the mating surface 98 of the valve body 22. In FIG. 4, the fluid-tight seal has begun to break as the valve plug 24 moves away from the closed position. In FIG. 5, the valve plug 24 is in a fully opened position, allowing fluid to escape the pressurized system.

FIG. 6 illustrates another embodiment of a rotatable valve assembly 220 according to the present disclosure. As illustrated, the assembly 220 includes a valve plug 224 mounted within a valve body 222 through a pair of rotatable shafts 238. A seal 296 is retained within the valve plug 224 by way of a clamp 260. The valve body 222 includes a mating surface 298 configured to mate with the valve seal 296 in the valve plug 224 when the valve plug 224 is in a closed position. As illustrated, the inner surface of the valve body 222 may be curved to accommodate the rotation of valve plug 224. Also as illustrated, the axis of rotation of rotatable shafts 238 is offset downstream from the seal 296.

Figure 8:
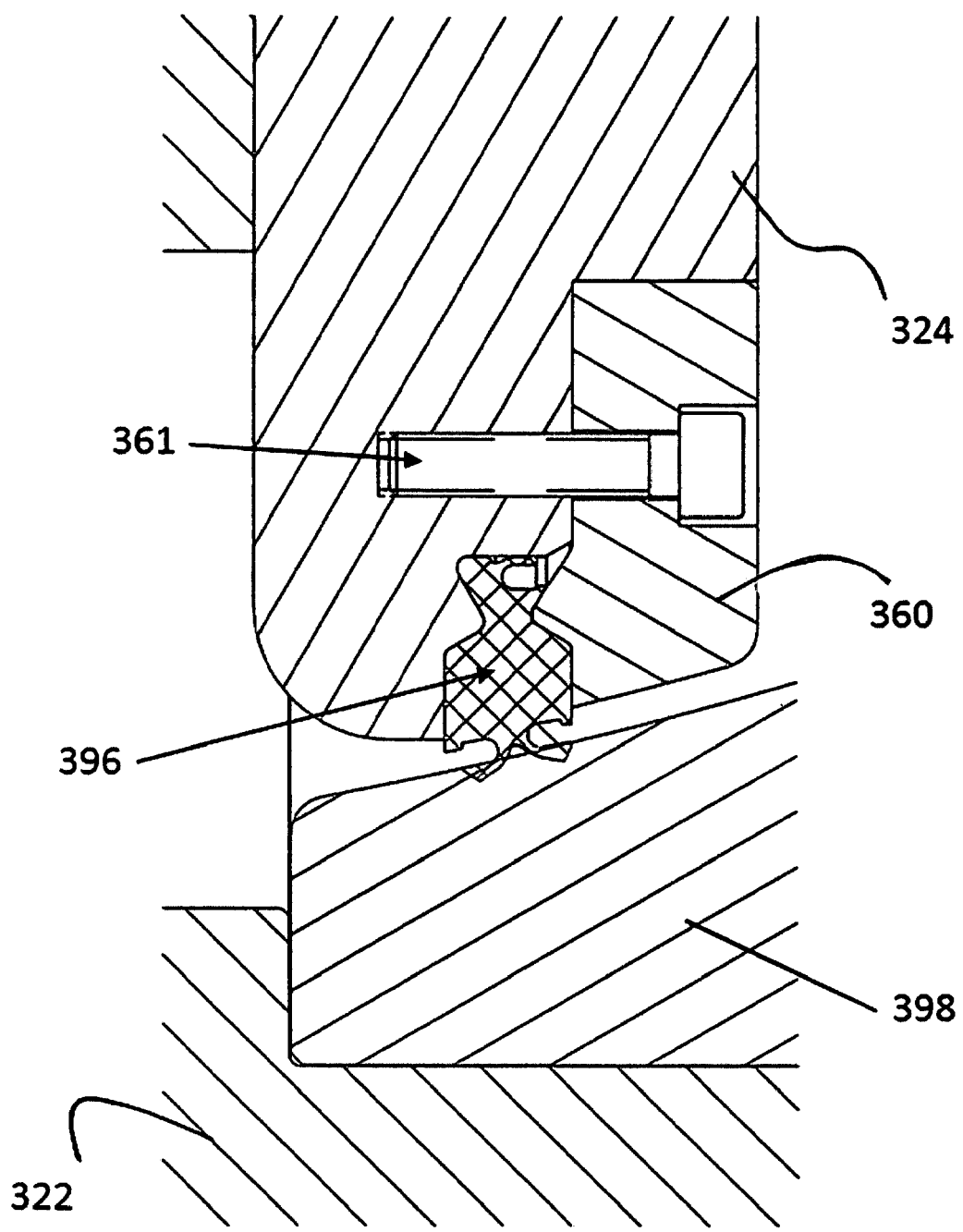
FIG. 8 is a detail view of the rotatable valve assembly of FIG. 7, illustrating a clamp and a seal.

FIGS. 7-8 illustrate another embodiment of a rotatable valve assembly 320. As illustrated, the assembly 320 includes a valve plug 324 mounted within a valve body 322 through a pair of rotatable shafts 338. A seal 396 is retained within the valve plug 324 by way of a clamp 360. As illustrated, the clamp 360 is clamped to the plug 324 using one or more screws 361 (FIG. 8). Additionally or alternatively, any other suitable clamping mechanism may be used to clamp the seal 396 into the plug 324. The seal 396 is clamped in a manner that places the sealing portion of the seal 396 in the desired location to achieve a leak-tight interface with a mating surface 398 of the valve body 322 when the plug 324 is in the closed position. As illustrated, the inner surface of the valve body 322 may be curved to accommodate the rotation of valve plug 324.

FIG. 8 shows a detailed view of the rotatable valve assembly 320 illustrated in FIG. 7. The seal 396 illustrated in FIG. 8 is a "double-lip" seal, which may be useful to achieve leak tightness in both flow directions (i.e., into and out of the pressurized system). However, the disclosure is not limited to any particular type of seal configuration. For example, it is contemplated that an 'O'-ring seal, wiper-type seal, or peninsula-type seal (which may project outwardly from a sealing surface) may be used. The seal may be configured such that increased inlet pressure may increase the sealing quality between the valve plug and valve body. For example, pressure on the inlet side of the double-lip seal 396 illustrated in FIG. 8 may cause the inlet-side lip to seal more strongly with the mating surface 398 (at least until the valve's opening pressure is reached and the plug is allowed to rotate). In one embodiment, a seal may be generated from a coating material applied to the valve plug. Additionally, although the seal illustrated in FIG. 8 is shown as a separate component clamped into the valve plug 324, it is also contemplated that a seal may be integrally formed within the valve plug.

FIG. 8 illustrates that the interface between the seal 396 and mating surface 398 may be offset from and form an angle with respect to the central axis of the fluid passageway (not shown in FIG. 8). In this manner, the seal 396 and mating surface 398 may contact one another only when the valve is in a closed position, such that friction between the seal 396 and mating surface 398 may be minimized or eliminated while the plug 324 is rotating toward an open position. It is contemplated that the features of an offset seal angle (as illustrated in FIG. 8) may be combined with the features of an offset rotational axis (FIG. 1 and FIG. 6) to achieve a double- or triple-offset configuration.

Figure 9:
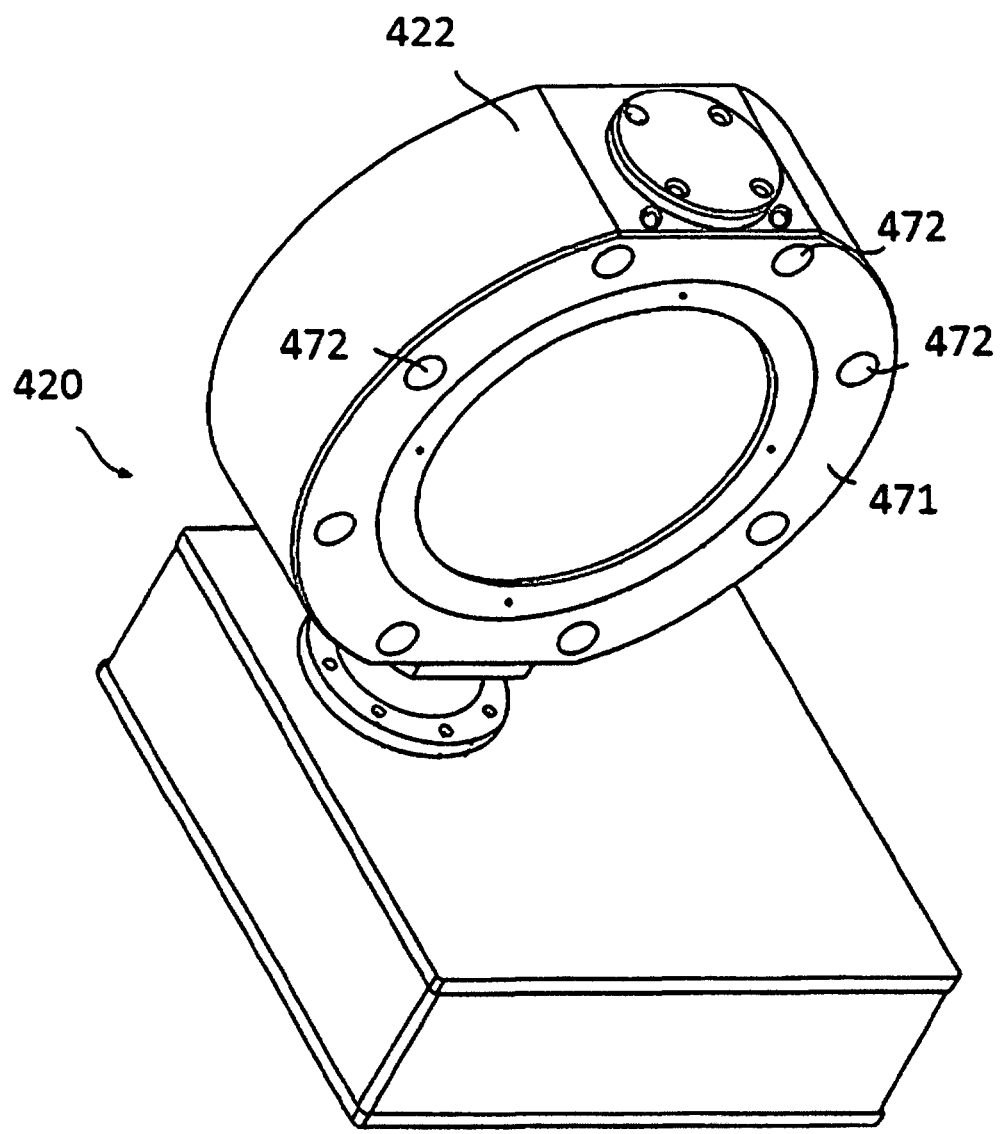
FIG. 9 is a perspective view of still another embodiment of a rotatable valve assembly.
Figure 10:
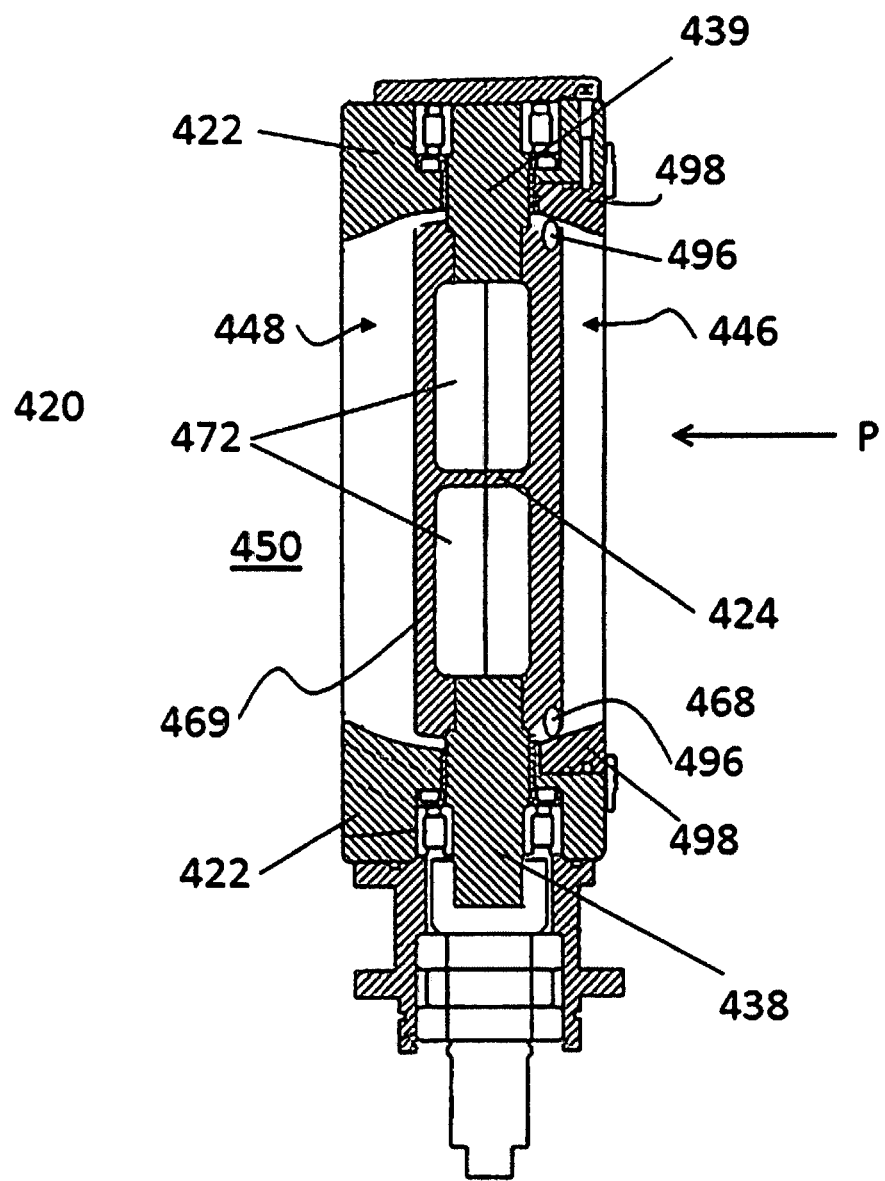
FIG. 10 is a cross-sectional view of the rotatable valve assembly of FIG. 9.

Another embodiment of a rotatable valve assembly 420 is illustrated in FIGS. 9 and 10. As shown, the valve assembly 420 includes a valve body 422. Body 422 has a flange 471 that contains a series of bolt holes 472. In one embodiment, bolt holes 472 are positioned in flange 471 to conform to the standard ANSI bolt pattern (or other standardized bolt pattern) for a pipe flange with a similar nominal size. Bolts, or other connecting devices, may be used to engage flange 471 with a corresponding pipe flange that is connected to a pressurized system (not shown). However, it is also contemplated that the rotatable valve assembly of the present disclosure may be engaged with the pressurized system in any other manner readily apparent to one skilled in the art.

As illustrated in FIG. 10, body 422 includes an inner surface that defines a fluid flowpath 450 having an inlet 446 and an outlet 448. Inner surface of body 422 may have a spherical or curved shape. When flange 471 (FIG. 9) is engaged with a pipe flange of a pressurized system, the system pipe flange guides pressurized fluid in the direction indicated by arrow P and into body 422, which directs the pressurized fluid into inlet 446.

A disclosed valve may include a shaft rotatably mounted in the body and a plug disposed in the fluid flowpath. The plug may be mounted on the shaft and may be rotatable between a closed position, where the plug prevents pressurized fluid from flowing through the fluid flowpath, and an open position, where pressurized fluid may be allowed to flow through the fluid flowpath. In one embodiment, the plug may be mounted on the shaft in an offset manner such that when the plug is in the closed position, the pressurized fluid acts on the plug to exert a torque on the shaft to rotate the plug from the closed position to the open position.

As illustrated in FIG. 10, a shaft 438 is rotatably mounted in body 422. Shaft 438 includes an exterior end that extends through body 422 and an interior end that extends into the plug 424. A bearing, such as roller bearing or a bushing, may be positioned between shaft 438 and body 422 to facilitate rotation of the shaft within body.

As is also shown in FIG. 10, a plug 424 is disposed within fluid flowpath 450. In one embodiment, plug 424 may include opposing sides with an internal passageway therebetween. As illustrated in FIG. 10, the plug 424 includes an inlet plate 468 and an outlet plate 469 that are joined together. In one embodiment, the inlet and outlet plates have a curved cross-sectional shape that generally conforms to the contour of inner surface of body 422. It is contemplated, however, that the inner surface of the valve body may form a straight bore on one or more sides, and the valve plug may be shaped accordingly. In addition, the plug may have alternative configurations, including a single plate design or a multiple plate design.

Referring again to FIG. 10, a second shaft 439 is rotatably mounted in body 422 opposite shaft 438. As with shaft 438, shaft 439 includes an interior end extending into fluid flowpath 450 (and into plug 424) and a bearing, such as roller bearing or a bushing, may be positioned between shaft 439 and body 422 to facilitate rotation of shaft 439 within body 422. Because shafts 438 and 439 are rotatably mounted in body 422, plug 424 is similarly rotatable with respect to body 422. Plug 424 may be rotated between a closed position, where the plug is substantially perpendicular to the direction of fluid flow, and an open position, where the plug is substantially parallel to the direction of fluid flow.

A seal 496 is disposed in the plug 424 of FIG. 10, As shown, the seal 496 is disposed in the inlet plate 468 of the valve plug 424. A seal may be provided additionally or alternatively in the outlet plate 469 of the valve plug 424. The seal 496 may be configured to provide a line seal engageable with a portion of the inner surface of the body 422 to prevent pressurized fluid from flowing between the plug and the body. Seal 496 may extend around the circumference of plug 424. In one embodiment, the seal 496 may be made of a soft, elastic material, such as a fluoroelastomer.

In one embodiment, the seal 496 may engage the body for between about 1.5 degrees and 5 degrees of rotation of the plug 424 between the closed position and the open position. The use of a line seal with a globed or spherical surface may result in a low torque valve that is more readily opened and reclosed. As such, the valve may be useful in low-pressure applications. Using a hollow plug 424 may reduce the mass that is moved between the open and closed positions, which also makes the valve useful for low-pressure applications.

As illustrated in FIG. 10, a replaceable seat 498 may be disposed on the inner surface of valve body 422. Seat 498 may be constructed of metal. Seat 498 may be constructed of the same material as valve body 422. In another embodiment, seat 498 may be constructed of a soft material, or may be constructed of the same material as seal 496. It is contemplated that the outer surface of replaceable seat 498 may include a coating, such as polytetrafluoroethylene (PTFE), to reduce the friction between the seal and the plug and allow the plug to more freely open in low pressure applications. Other coatings and materials may be selected to change other attributes of the interface between the seal and the plug.

A retaining ring (not shown) may engage with the valve plug 424 to hold seal 496 in place. In one embodiment, the valve plug 424 and the retaining ring may be configured so that the retaining ring may be engaged with valve plug 424 with a press-fit. The present invention contemplates that the retaining ring may be engaged with the valve plug by other methods, such as, for example, corresponding threads on the retaining ring and valve plug.

It is contemplated that the described rotatable pressure relief valve may be used as a reclosing valve or a non-reclosing valve. In one embodiment of a non-reclosing valve, the plug 424 may rotate through approximately 90 degrees in moving from the closed position to the open position. This places the inlet and outlet plates 468, 469 substantially parallel to the direction of fluid flow to afford the highest fluid flow rate to most efficiently reduce the pressure within the system. In an embodiment of a reclosing valve, the plug 424 may rotate through less than 90 degrees (e.g., approximately 85 degrees) in moving from the closed position to the fully open position, In this position, the inlet and outlet plates 468, 469 are positioned such that the fluid continues to exert a force on the plug. When the pressure of the fluid, and the resultant force on the plug, drop below a certain limit, a spring or other similar mechanism (not shown) may rotate the plug back to the closed position.

A position indicator (not shown) may be used to indicate whether the plug is in the open position or in the closed position, In one embodiment, a position indicator may be attached to shaft 439 and may be viewed through a transparent cap on the valve body 422.

In addition to a seal on the valve plug, it is further contemplated that a second seal may also be mounted on the valve body. In such an embodiment, the body seal and the plug seal may seal against one another to create a fluid-tight interface. Using cooperative seals may be desirable to alter the effects of friction between the sealing surfaces. For example, to ease the closing and opening of the valve, the materials or shapes of the cooperative seals may be selected to reduce friction between them. Alternatively, it may be desirable to choose seal materials and shapes to increase friction between the seals and/or between the seal and valve body. Furthermore, the cooperative seals may be shaped to interlock with one another to strengthen or otherwise achieve a desired sealed interface.

The foregoing embodiments are exemplary only. Other embodiments will be apparent to those skilled in the art from consideration of the specification and practice of the disclosure herein.

What is claimed is:

1. A rotatable pressure relief valve assembly, comprising:
a body defining an inner surface, the plug having a central axis defining a fluid flow path;
a plug mounted within the body, the plug being rotatable between an open position and a closed position;
a seal attached to the plug and configured to form a fluid-tight barrier with the inner surface of the body when the plug is in the closed position; and,
a shaft coupled with the plug to allow the plug to rotate between an open position and a closed position;
wherein the inner surface of the body is curved along a cross-section along the central axis, wherein the curve is configured to accommodate the rotation of the plug; and,
wherein the shaft defines a rotational axis; the body defines a fluid passageway having a central axis, and the wherein the rotational axis of the shaft is offset from the central axis of the fluid passageway.

2. The valve assembly of claim 1, wherein the seal is a double-lip seal having an inlet-side lip and an outlet-side lip, wherein the inlet-side lip is configured to be exposed to a pressure on an inlet side of the plug, and wherein the inlet-side lip is further configured to increase a sealing pressure against the inner surface of the body in response to an increase in the pressure on the inlet side of the plug.

3. The valve assembly of claim 1, wherein the seal is formed from a coating applied to the plug.

4. The valve assembly of claim 1, further comprising:
a clamp, wherein the clamp is configured to retain the seal against the plug.

5. The valve assembly of claim 1, wherein the seal is a first seal, further comprising:
a second seal provided in the body; and
wherein the first seal and second seal are configured to form the fluid-tight barrier when the plug is in the closed position.

6. The valve assembly of claim 5, wherein the first seal is formed from a first material, wherein the second seal is formed from a second material, and wherein the first material and second material are the same material.

7. A rotatable pressure relief valve assembly, comprising:
a body defining an inner surface, the plug having a central axis defining a fluid flow path;
a plug mounted within the body, the plug being rotatable between an open position and a closed position;
a seal attached to the plug and configured to form a fluid-tight barrier with the inner surface of the body when the plug is in the closed position; and,
a release mechanism configured to keep the plug in the closed position until a predetermined fluid pressure differential is applied to the plug;
wherein the inner surface of the body is curved along a cross-section along the central axis, wherein the curve is configured to accommodate the rotation of the plug.

8. The valve assembly of claim 7, wherein the release mechanism comprises at least one of a failure pin, a beam, a bar, a plate, a disk, or a spring configured to deform when the predetermined fluid pressure differential is applied to the plug.

9. The valve assembly of claim 1, wherein the valve body comprises a replaceable seat disposed on the inner surface of the valve body.

10. The valve assembly of claim 1, wherein the valve plug is a reclosing valve plug.

* * * * *